(12) United States Patent
Chen et al.

(10) Patent No.: US 10,849,108 B2
(45) Date of Patent: Nov. 24, 2020

(54) METHOD AND DEVICE IN UE AND BASE STATION FOR WIRELESS COMMUNICATION

(71) Applicant: SHANGHAI LANGBO COMMUNICATION TECHNOLOGY COMPANY LIMITED, Shanghai (CN)

(72) Inventors: JinHui Chen, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/435,573

(22) Filed: Jun. 10, 2019

(65) Prior Publication Data

US 2019/0380118 A1 Dec. 12, 2019

(30) Foreign Application Priority Data

Jun. 11, 2018 (CN) .......................... 2018 1 0593557

(51) Int. Cl.
*H04W 72/04* (2009.01)

(52) U.S. Cl.
CPC .............................. *H04W 72/0406* (2013.01)

(58) Field of Classification Search
CPC ... H04L 5/0055; H04L 1/1812; H04L 1/1819; H04W 72/042; H04W 72/14
See application file for complete search history.

(56) References Cited

U.S. PATENT DOCUMENTS

| 2017/0288817 A1* | 10/2017 | Cao ........................ H04L 1/1812 |
| 2018/0270807 A1* | 9/2018 | Salem ................... H04L 5/0048 |
| 2019/0230691 A1* | 7/2019 | Cao ........................ H04L 5/0044 |
| 2019/0253193 A1* | 8/2019 | Kim ....................... H04L 5/0048 |

* cited by examiner

*Primary Examiner* — Jung H Park
(74) *Attorney, Agent, or Firm* — Maschoff Brennan

(57) ABSTRACT

The disclosure provides a method and a device in a User Equipment (UE) and a base station for wireless communication. The UE, in turn, receives first control information, transmits a first and a second radio signal, wherein the first control information is used for indicating a first multiple access signature sequence, the first multiple access signature sequence includes a first and a second multiple access signature in turn, the first multiple access signature is used for generating the first radio signal based on a first bit block, and the second multiple access signature is used for generating the second radio signal based on a second bit block. According to the disclosure, different multiple access signatures are configured on different time-frequency resources for the UE, which reduces interferences or conflicts between uplink communications due to conflicts of multiple access signatures between multiple users or correlations between non-orthogonal multiple access signatures.

20 Claims, 11 Drawing Sheets

| Index | Redundancy versions | Multiple access signatures |
|---|---|---|
| 1 | Redundancy version #1 | Multiple access signature #1 |
| 2 | Redundancy version #2 | Multiple access signature #2 |
| 3 | Redundancy version #3 | Multiple access signature #3 |
| 4 | Redundancy version #4 | Multiple access signature #4 |

FIG. 8

METHOD AND DEVICE IN UE AND BASE STATION FOR WIRELESS COMMUNICATION

CROSS-REFERENCE TO RELATED APPLICATION

This application claims the priority benefit of Chinese Patent Application Serial Number 201810593557.9 filed on Jun. 11, 2018, the full disclosure of which is incorporated herein by reference.

BACKGROUND

Technical Field

The disclosure relates to transmission methods and devices in wireless communication systems, and in particular to a method and a device for uplink transmission based on multiple access signature.

Related Art

In conventional 3rd Generation Partner Project (3GPP) Long-term Evolution (LTE) systems, uplink transmissions on terminal side usually employ orthogonal multiple access. However, in 5G NR (New Radio Access Technology) discussions, multiple terminals may employ Non-orthogonal Multiple Access (NOMA) technologies, thereby increasing the number of User Equipments (UEs) which perform uplink transmissions simultaneously. Configured grant or grant-free communications probably may employ NOMA technologies. In configured grant or grant-free communications, the UE determines autonomously whether to perform uplink transmission on a resource in an allocated resource pool.

SUMMARY

Since configured grant or grant-free communications would apply higher-layer signalings with long periodicity, for example, Radio Resource Control (RRC) signaling, to a UE to carry out resource configuration, probably also including multiple access signature configuration. The configuration of a single multiple access signature for a UE probably may cause interferences or communication conflicts of non-orthogonal signatures between multiple UEs which perform uplink transmissions simultaneously. Therefore, how to configure a multiple access signature for a UE through a higher-layer signaling is a problem to be resolved.

In view of the above problems, the disclosure provides a solution. The embodiments of the UE of the disclosure and the characteristics in the embodiments may be applied to the base station if no conflict is incurred, and vice versa. The embodiments of the disclosure and the characteristics in the embodiments may be mutually combined if no conflict is incurred.

The disclosure provides a method in a UE for wireless communication, wherein the method includes in turn:
receiving first control information, the first control information being used for indicating a first multiple access signature sequence, the first multiple access signature sequence including a first multiple access signature and a second multiple access signature in turn;
transmitting a first radio signal, the first radio signal occupying a first Resource Element (RE) set, and the first multiple access signature being used for generating the first radio signal based on a first bit block; and
transmitting a second radio signal, the second radio signal occupying a second RE set, the first RE set being orthogonal to the second RE set, and the second multiple access signature being used for generating the second radio signal based on a second bit block.

In one embodiment, the above method has a following benefit: different multiple access signatures are configured on different time-frequency resources for the UE, which reduces interferences or conflicts between uplink communications due to conflicts of multiple access signatures between multiple users or correlations between non-orthogonal multiple access signatures.

Specifically, according to one aspect of the disclosure, the method includes:
generating the first radio signal; and
generating the second radio signal.

Specifically, according to one aspect of the disclosure, the first control information indicates a first redundancy version sequence, the first redundancy version sequence is associated with the first multiple access signature sequence, the first multiple access signature corresponds to a first redundancy version in the first redundancy version sequence, the second multiple access signature corresponds to a second redundancy version in the first redundancy version sequence, the first redundancy version is used for generating the first bit block, and the second redundancy version is used for generating the second bit block.

In one embodiment, the above method has a following benefit: the multiple access signature sequence used for retransmission is indicated through indication of the redundancy version sequence, thus signaling overheads used for indicating the multiple access signature sequence are reduced.

Specifically, according to one aspect of the disclosure, if the first redundancy version is the same as the second redundancy version, the first multiple access signature is the same as the second multiple access signature.

In one embodiment, the above method has a following benefit: it is convenient to merge retransmissions of a same redundancy version.

Specifically, according to one aspect of the disclosure, the first bit block and the second bit block carry a same transport block.

In one embodiment, the above method has a following benefit: a different multiple access signature is employed in retransmission, which reduces interferences to retransmission.

Specifically, according to one aspect of the disclosure, the method includes:
receiving second control information, the second control information being used for indicating a difference value between the second multiple access signature index and the first multiple access signature index.

In one embodiment, the above method has a following benefit: the base station indicates multiple access signatures through the difference value, thereby optimizing system performances.

Specifically, according to one aspect of the disclosure, the multiple access signature includes at least one of a spreading sequence, a mapping constellation, an interleaving table and a scrambling sequence.

The disclosure provides a method in a base station for wireless communication, wherein the method includes in turn:
transmitting first control information, the first control information being used for indicating a first multiple access signature sequence, the first multiple access signature sequence including a first multiple access signature and a second multiple access signature in turn;

receiving a first radio signal, the first radio signal occupying a first RE set, and the first multiple access signature being used for generating the first radio signal based on a first bit block; and receiving a second radio signal, the second radio signal occupying a second RE set, the first RE set being orthogonal to the second RE set, and the second multiple access signature being used for generating the second radio signal based on a second bit block.

Specifically, according to one aspect of the disclosure, the method includes:

recovering the first bit block; and
recovering the second bit block.

Specifically, according to one aspect of the disclosure, the first control information indicates a first redundancy version sequence, the first redundancy version sequence is associated with the first multiple access signature sequence, the first multiple access signature corresponds to a first redundancy version in the first redundancy version sequence, the second multiple access signature corresponds to a second redundancy version in the first redundancy version sequence, the first redundancy version is used for generating the first bit block, and the second redundancy version is used for generating the second bit block.

Specifically, according to one aspect of the disclosure, if the first redundancy version is the same as the second redundancy version, the first multiple access signature is the same as the second multiple access signature.

Specifically, according to one aspect of the disclosure, the first bit block and the second bit block carry a same transport block.

Specifically, according to one aspect of the disclosure, the method includes:

transmitting second control information, the second control information being used for indicating a difference value between the second multiple access signature index and the first multiple access signature index.

Specifically, according to one aspect of the disclosure, the multiple access signature includes at least one of a spreading sequence, a mapping constellation, an interleaving table and a scrambling sequence.

The disclosure provides a UE for wireless communication, wherein the UE includes in turn:

a first receiver module, to receive first control information, the first control information being used for indicating a first multiple access signature sequence, the first multiple access signature sequence including a first multiple access signature and a second multiple access signature in turn;

a second transmitter module, to transmit a first radio signal, the first radio signal occupying a first RE set, and the first multiple access signature being used for generating the first radio signal based on a first bit block; and a third transmitter module, to transmit a second radio signal, the second radio signal occupying a second RE set, the first RE set being orthogonal to the second RE set, and the second multiple access signature being used for generating the second radio signal based on a second bit block.

In one embodiment, the above UE is characterized in that: the second transmitter module generates the first radio signal, and the third transmitter module generates the second radio signal.

In one embodiment, the above UE is characterized in that: the first control information indicates a first redundancy version sequence, the first redundancy version sequence is associated with the first multiple access signature sequence, the first multiple access signature corresponds to a first redundancy version in the first redundancy version sequence, the second multiple access signature corresponds to a second redundancy version in the first redundancy version sequence, the first redundancy version is used for generating the first bit block, and the second redundancy version is used for generating the second bit block.

In one embodiment, the above UE is characterized in that: if the first redundancy version is the same as the second redundancy version, the first multiple access signature is the same as the second multiple access signature.

In one embodiment, the above UE is characterized in that: the first bit block and the second bit block carry a same transport block.

In one embodiment, the above UE is characterized in that: the first receiver module receives second control information, the second control information being used for indicating a difference value between the second multiple access signature index and the first multiple access signature index.

In one embodiment, the above UE is characterized in that: the multiple access signature includes at least one of a spreading sequence, a mapping constellation, an interleaving table and a scrambling sequence.

The disclosure provides a base station for wireless communication, wherein the base station includes in turn:

a first transmitter module, to transmit first control information, the first control information being used for indicating a first multiple access signature sequence, the first multiple access signature sequence including a first multiple access signature and a second multiple access signature in turn;

a second receiver module, to receive a first radio signal, the first radio signal occupying a first RE set, and the first multiple access signature being used for generating the first radio signal based on a first bit block; and a third receiver module, to receive a second radio signal, the second radio signal occupying a second RE set, the first RE set being orthogonal to the second RE set, and the second multiple access signature being used for generating the second radio signal based on a second bit block.

In one embodiment, the above base station is characterized in that: the second receiver module recovers the first bit block; and the third receiver module recovers the second bit block.

In one embodiment, the above base station is characterized in that: the first control information indicates a first redundancy version sequence, the first redundancy version sequence is associated with the first multiple access signature sequence, the first multiple access signature corresponds to a first redundancy version in the first redundancy version sequence, the second multiple access signature corresponds to a second redundancy version in the first redundancy version sequence, the first redundancy version is used for generating the first bit block, and the second redundancy version is used for generating the second bit block.

In one embodiment, the above base station is characterized in that: if the first redundancy version is the same as the second redundancy version, the first multiple access signature is the same as the second multiple access signature.

In one embodiment, the above base station is characterized in that: the first bit block and the second bit block carry a same transport block.

In one embodiment, the above base station is characterized in that: the first transmitter module transmits second control information, the second control information being used for indicating a difference value between the second multiple access signature index and the first multiple access signature index.

In one embodiment, the above base station is characterized in that: the multiple access signature includes at least one of a spreading sequence, a mapping constellation, an interleaving table and a scrambling sequence.

In one embodiment, compared with conventional schemes, the disclosure has the following advantages.

Different multiple access signatures are configured on different time-frequency resources for the UE, which reduces interferences or conflicts between uplink communications due to conflicts of multiple access signatures between multiple users or correlations between non-orthogonal multiple access signatures.

The multiple access signature sequence used for retransmission is indicated through indication of the redundancy version sequence, thus signaling overheads used for indicating the multiple access signature sequence are reduced.

It is convenient to merge retransmissions of a same redundancy version.

BRIEF DESCRIPTION OF THE DRAWINGS

Other features, purposes and advantages of the disclosure will become more apparent from the detailed description of non-restrictive embodiments taken in conjunction with the following drawings.

FIG. 8 is a diagram illustrating a relationship between a first redundancy version sequence and a first multiple access signature sequence according to one embodiment of the disclosure.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is incurred.

Embodiment 1

Figure 1:
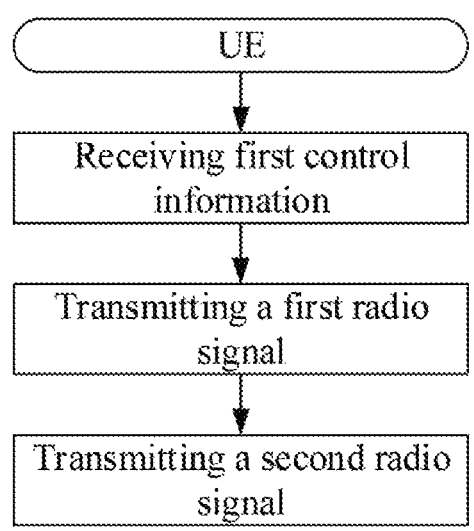
FIG. 1 is a flowchart of a first radio signal and a second radio signal according to one embodiment of the disclosure.

Embodiment 1 illustrates an example of a flowchart of a first radio signal and a second radio signal, as shown in FIG. 1.

In Embodiment 1, the UE in the disclosure, in turn, receives first control information, transmits a first radio signal and transmits a second radio signal; the first control information is used for indicating a first multiple access signature sequence, the first multiple access signature sequence includes a first multiple access signature and a second multiple access signature in turn; the first radio signal occupies a first RE set, and the first multiple access signature is used for generating the first radio signal based on a first bit block; the second radio signal occupies a second RE set, the first RE set is orthogonal to the second RE set, and the second multiple access signature is used for generating the second radio signal based on a second bit block.

In one subembodiment, a higher-layer signaling is used for transmitting the first control information.

In one subembodiment, an RRC signaling is used for transmitting the first control information.

In one subembodiment, the first control information is an Information Element (IE) in one RRC signaling.

In one subembodiment, a Physical Downlink Shared Channel (PDSCH) is used for carrying the first control information.

In one subembodiment, the first RE set and the second RE set are both composed of a positive integer number of REs.

In one subembodiment, the RE is a smallest unit of time-frequency resource allocation.

In one subembodiment, one RE occupies a width of one subcarrier in frequency domain.

In one subembodiment, one RE occupies 15 KHz in frequency domain.

In one subembodiment, one RE occupies 60 KHz in frequency domain.

In one subembodiment, one RE occupies, in time domain, a width of one Orthogonal Frequency Division Multiplexing (OFDM) symbol in the time domain.

In one subembodiment, one RE occupies, in time domain, a width of one Discrete Fourier Transform Spread OFDM (DFT-S-OFDM) symbol in the time domain.

In one subembodiment, the first RE set and the second RE set both include a positive integer number of Resource Blocks (RBs), and one RB includes a plurality of REs.

In one subembodiment, one RB includes 12 REs which are consecutive in frequency domain.

In one subembodiment, the first RE set and the second RE set are indicated by a base station.

In one subembodiment, the first RE set and the second RE set are determined by the UE.

In one subembodiment, the first RE set and the second RE set both belong to a first RE pool, the first RE pool is indicated by a base station, and the UE determines the first RE set and the second RE set from the first RE pool autonomously.

In one subembodiment, the first RE set and the second RE set are orthogonal in time domain resources, and all REs in the second RE set are located behind all REs in the first RE set in time domain.

In one subembodiment, the first RE set and the second RE set have an overlapping part in frequency domain.

In one subembodiment, a base station does not assume that the UE must transmit a signal on the RE in the first RE pool.

In one subembodiment, a base station performs a blind detection on the RE in the first RE pool so as to determine whether the UE transmits data or a higher-layer signaling to the base station.

In one subembodiment, a base station indicates the first RE pool through an RRC signaling.

In one subembodiment, a base station indicates the first RE pool through a semi-static signaling.

In one subembodiment, a base station activates a configuration of the first RE pool through a physical layer signaling.

In one subembodiment, a base station deactivates a configuration of the first RE pool through a physical layer signaling.

In one subembodiment, a base station activates a configuration of the first RE pool through a dynamic signaling.

In one subembodiment, a base station deactivates a configuration of the first RE pool through a dynamic signaling.

In one subembodiment, transmissions of the first radio signal and the second radio signal are configured grant.

In one subembodiment, transmissions of the first radio signal and the second radio signal are grant-free.

In one subembodiment, the first radio signal is used for carrying data.

In one subembodiment, the first radio signal is used for carrying a higher-layer signaling.

In one subembodiment, the first radio signal is used for carrying a physical layer signaling.

In one subembodiment, the second radio signal is used for carrying data.

In one subembodiment, the second radio signal is used for carrying a higher-layer signaling.

In one subembodiment, the second radio signal is used for carrying a physical layer signaling.

In one subembodiment, a Physical Uplink Shared Channel (PUSCH) is used for carrying the first radio signal and the second radio signal.

In one subembodiment, channel coding is used for generating the first bit block and the second bit block.

In one subembodiment, rate matching is used for generating the first bit block and the second bit block.

In one subembodiment, the first bit block generates the first radio signal after passing through a multiple access signature module employing the first multiple access signature.

In one subembodiment, the second bit block generates the second radio signal after passing through a multiple access signature module employing the second multiple access signature.

In one subembodiment, the multiple access signature module includes at least one of modulation mapping, symbol level extension, symbol level interleaving and symbol level scrambling.

In one subembodiment, an output of the multiple access signature module is processed in turn through precoding, resource mapping and generation of OFDM symbols to generate the first radio signal.

In one subembodiment, an output of the multiple access signature module is processed in turn through layer mapping, transform precoding, precoding, resource mapping and generation of DFT-s-OFDM symbols to generate the first radio signal.

In one subembodiment, the UE generates the first radio signal and the second radio signal in turn.

In one subembodiment, the first control information indicates a first redundancy version sequence, the first redundancy version sequence is associated with the first multiple access signature sequence, the first multiple access signature corresponds to a first redundancy version in the first redundancy version sequence, the second multiple access signature corresponds to a second redundancy version in the first redundancy version sequence, the first redundancy version is used for generating the first bit block, and the second redundancy version is used for generating the second bit block.

In one subembodiment, redundancy versions in the first redundancy version sequence are one-to-one corresponding to multiple access signatures in the first multiple access signature sequence.

In one subembodiment, the first redundancy version sequence includes K redundancy versions, the K is a positive integer greater than 1, the K redundancy versions are one-to-one corresponding to the K multiple access signatures, the first multiple access signature sequence includes K multiple access signatures, and the K multiple access signatures belong to K multiple access signature groups respectively.

In one subembodiment, the UE determines autonomously the K multiple access signatures from the K multiple access signature groups.

In one subembodiment, the base station indicates the K multiple access signatures from the K multiple access signature groups.

In one subembodiment, the K is equal to 4.

In one subembodiment, different redundancy versions correspond to different coding rates.

In one subembodiment, one same transport block outputs different bit strings used for modulation mapping, when employing different redundancy versions.

In one subembodiment, one same transport block outputs different bit strings through a rate matching module, when employing different redundancy versions.

In one subembodiment, the redundancy version is used by a rate matching module to generate an output bit string.

In one subembodiment, redundancy versions in the first redundancy version sequence are in turn used for retransmissions of one same transport block In one subembodiment, if the first redundancy version is the same as the second redundancy version, the first multiple access signature is the same as the second multiple access signature.

In one subembodiment, the first redundancy version is different from the second redundancy version, and the first multiple access signature is different from the second multiple access signature.

In one subembodiment, the first redundancy version is the same as the second redundancy version, and the first multiple access signature is different from the second multiple access signature.

In one subembodiment, a base station indicates a corresponding relationship between a redundancy version and a multiple access signature of the UE.

In one subembodiment, the first bit block and the second bit block carry a same transport block.

In one subembodiment, the transmission of the second radio signal is one time of retransmission.

In one subembodiment, the UE receives second control information, and the second control information is used for indicating a difference value between the second multiple access signature index and the first multiple access signature index.

In one subembodiment, a Physical Downlink Control Channel (PDCCH) is used for carrying the second control information.

In one subembodiment, the second control information is Downlink Control Information (DCI).

In one subembodiment, a first bit in one DCI is used for indicating a difference value between the second multiple access signature index and the first multiple access signature index.

In one subembodiment, if the first bit has a value of 1, the UE employs in turn the multiple access signatures in the first multiple access signature sequence to generate radio signals; if the first bit has a value of 0, the UE employs only the first multiple access signature to generate a radio signal.

In one subembodiment, the multiple access signature includes at least one of a spreading sequence, a mapping constellation, an interleaving table and a scrambling sequence.

Embodiment 2

Figure 2:
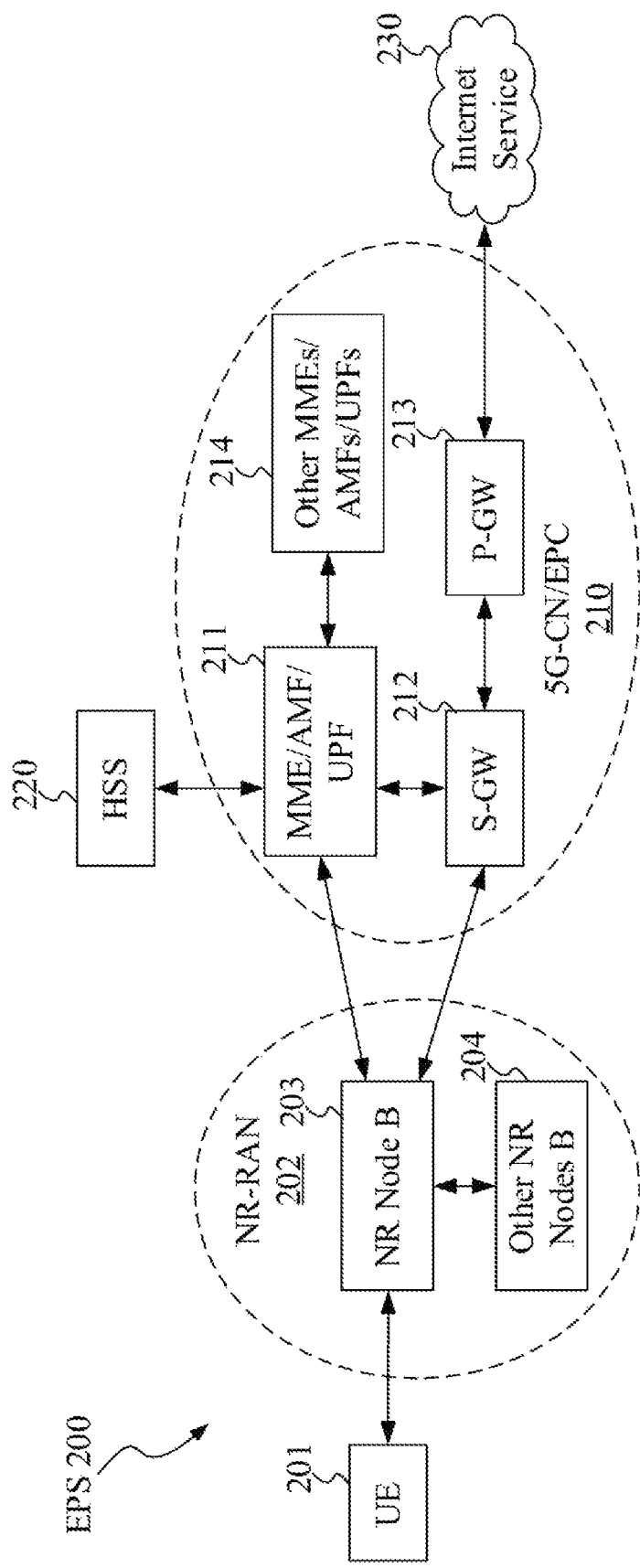
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR LTE and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, a 5G-Core Network/Evolved Packet Core (5G-CN/EPC) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), satellite radios, non-territorial base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the base station in the disclosure.

In one subembodiment, the UE 201 is a terminal which supports performing wireless communications on unlicensed spectrum.

In one subembodiment, the UE 201 is a terminal which supports grant-free transmission.

In one subembodiment, the UE 201 is a terminal which supports beamforming.

In one subembodiment, the UE 201 is a terminal which supports narrow-band LBT.

In one subembodiment, the gNB 203 supports performing wireless communication on unlicensed spectrum.

In one subembodiment, the gNB 203 supports grant-free transmission.

In one subembodiment, the gNB 203 supports beamforming based uplink transmission.

Embodiment 3

Figure 3:
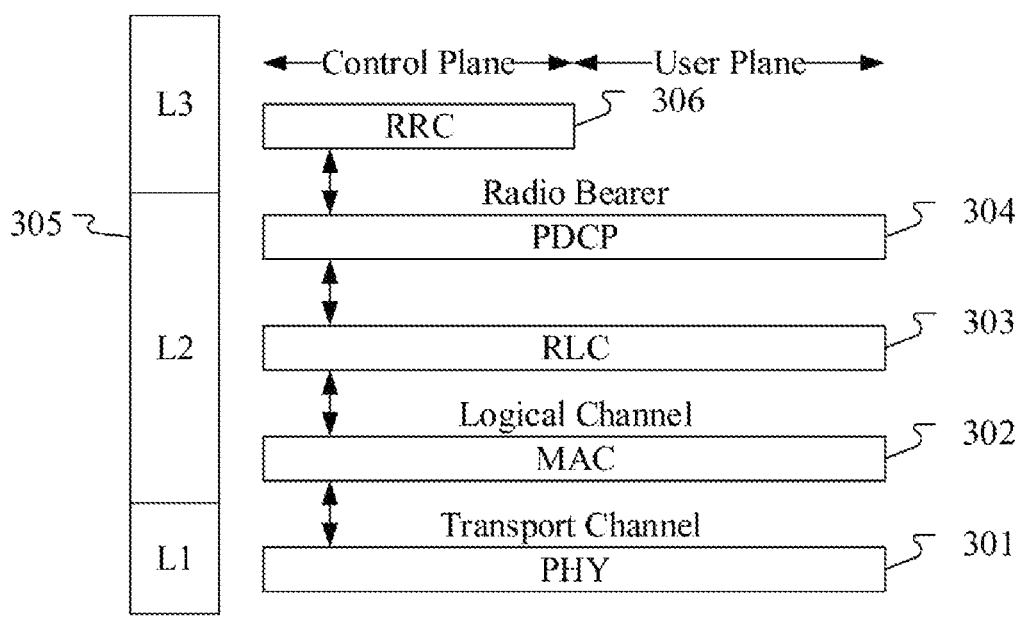
FIG. 3 is a diagram illustrating an embodiment of a radio protocol architecture of a user plane and a control plane according to one embodiment of the disclosure.

Embodiment 3 illustrates an example of a radio protocol architecture of a user plane and a control plane, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the first control information in the disclosure is generated by the RRC sublayer 306.

In one subembodiment, the first radio signal in the disclosure is generated by the PHY 301.

In one subembodiment, the second radio signal in the disclosure is generated by the PHY 301.

In one subembodiment, the second control information in the disclosure is generated by the PHY 301.

Embodiment 4

Figure 4:
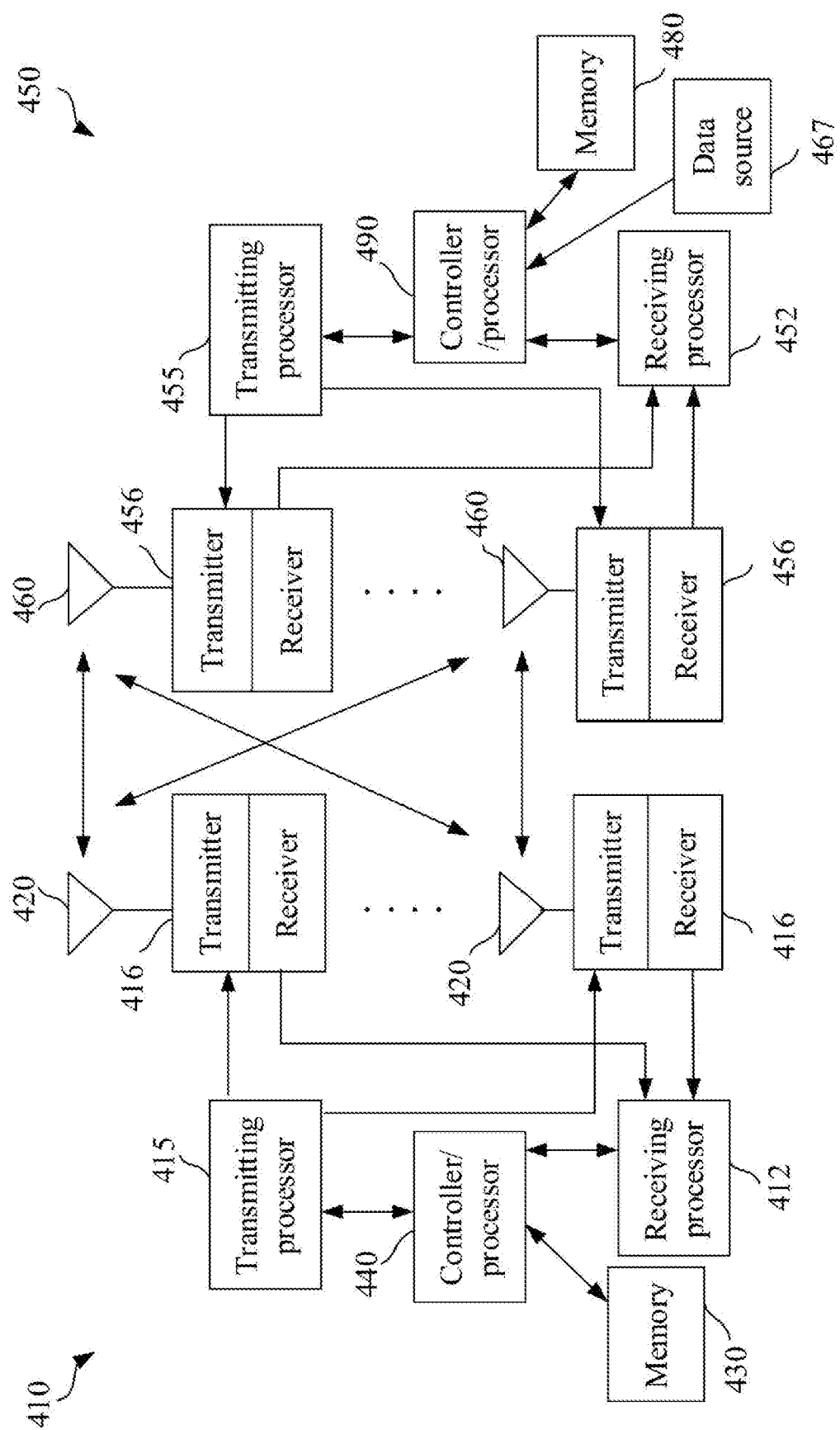
FIG. 4 is a diagram illustrating an evolved node B and a UE according to one embodiment of the disclosure.

Embodiment 4 illustrates an example of a base station and a UE, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In uplink transmission, processes relevant to the base station 410 include the following.

The receiver 416 receives a radio-frequency signal through the corresponding antenna 420, converts the received radio-frequency signal into a baseband signal, and provides the baseband signal to the receiving processor 412.

The receiving processor 412 performs various signal receiving processing functions of L1 layer (that is, PHY), including decoding, de-interleaving, descrambling, demodulation, extraction of physical layer control signalings, etc.

The receiving processor 412 performs various signal receiving processing functions of L1 layer (that is, PHY), including multi-antenna receiving, despreading, code division multiplexing, precoding, etc.

The controller/processor 440 performs functions of L2 layer, and is connected to the memory 430 that stores program codes and data.

The controller/processor 440 provides multiplexing between a transport channel and a logical channel, packet reassembling, decryption, header decompression, and control signal processing so as to recover a higher-layer packet coming from the UE 450. The higher-layer packet from the controller/processor 440 may be provided to a core network.

The controller/processor 440 determines target air interface resources that a target radio signal probably occupies, and sends the result to the receiving processor 412; determines through a blind detection whether the target uplink radio signal occupies the target air interface resources; the target radio signal includes the first radio signal and the second radio signal in the disclosure; the target air interface resources include at least one of time domain resources, frequency domain resources or spatial resources occupied by the first radio signal and the second radio signal; the spatial resources correspond to antenna port groups occupied respectively by the first radio signal and the second radio signal.

In UL transmission, processes relevant to the UE 450 include the following.

The data source 467 provides a higher-layer packet to the controller/processor 490. The data source 467 illustrates all protocol layers above L2 layer.

The transmitter 456 transmits a radio-frequency signal through the corresponding antenna 460, converts a baseband signal into a radio-frequency signal and provides the radio-frequency signal to the corresponding antenna 460.

The transmitting processor 455 performs various signal transmitting processing functions of L1 layer (that is, PHY), including encoding, interleaving, scrambling, modulation, generation of physical layer signalings, etc.

The transmitting processor 455 performs various signal transmitting processing functions of L1 layer (that is, PHY), including multi-antenna transmitting, spreading, code division multiplexing, precoding, etc.

The controller/processor 490 performs header compression, encryption, packet segmentation and reordering, and multiplexing between a logical channel and a transport channel based on the radio resource allocation of the gNB 410, and performs functions of Layer 2 used for the user plane and the control plane.

The controller/processor 490 is also in charge of HARQ operation, retransmission of lost packets, and signalings to the eNB 410.

The controller/processor 490 determines autonomously target air interface resources that a target radio signal occupies, and sends the result to the transmitting processor 455; the target radio signal includes the first radio signal and the second radio signal in the disclosure; the target air interface resources include at least one of time domain resources, frequency domain resources or spatial resources occupied by the first radio signal and the second radio signal; the spatial resources correspond to antenna port groups occupied respectively by the first radio signal and the second radio signal.

In one subembodiment, the UE 450 device includes at least one processor and at least one memory. The at least one memory includes computer program codes. The at least one memory and the computer program codes are configured to be used in collaboration with the at least one processor. The UE 450 device at least receives first control information, the first control information being used for indicating a first multiple access signature sequence, the first multiple access signature sequence including a first multiple access signature and a second multiple access signature in turn; transmits a first radio signal, the first radio signal occupying a first RE set, and the first multiple access signature being used for generating the first radio signal based on a first bit block; and transmits a second radio signal, the second radio signal occupying a second RE set, the first RE set being orthogonal to the second RE set, and the second multiple access signature being used for generating the second radio signal based on a second bit block.

In one subembodiment, the UE 450 includes a memory that stores a computer readable instruction program. The computer readable instruction program generates an action when executed by at least one processor. The action includes: receiving first control information, the first control information being used for indicating a first multiple access signature sequence, the first multiple access signature sequence including a first multiple access signature and a second multiple access signature in turn; transmitting a first radio signal, the first radio signal occupying a first RE set, and the first multiple access signature being used for generating the first radio signal based on a first bit block; and transmitting a second radio signal, the second radio signal occupying a second RE set, the first RE set being orthogonal to the second RE set, and the second multiple access signature being used for generating the second radio signal based on a second bit block.

In one subembodiment, the gNB 410 device includes at least one processor and at least one memory. The at least one memory includes computer program codes. The at least one memory and the computer program codes are configured to be used in collaboration with the at least one processor. The gNB 410 device at least transmits first control information, the first control information being used for indicating a first multiple access signature sequence, the first multiple access signature sequence including a first multiple access signature and a second multiple access signature in turn; receiving a first radio signal, the first radio signal occupying a first RE set, and the first multiple access signature being used for generating the first radio signal based on a first bit block; and receiving a second radio signal, the second radio signal occupying a second RE set, the first RE set being orthogonal to the second RE set, and the second multiple access signature being used for generating the second radio signal based on a second bit block.

In one subembodiment, the gNB 410 includes a memory that stores a computer readable instruction program. The computer readable instruction program generates an action when executed by at least one processor. The action includes: transmitting first control information, the first control information being used for indicating a first multiple access signature sequence, the first multiple access signature sequence including a first multiple access signature and a second multiple access signature in turn; receiving a first radio signal, the first radio signal occupying a first RE set, and the first multiple access signature being used for generating the first radio signal based on a first bit block; and receiving a second radio signal, the second radio signal occupying a second RE set, the first RE set being orthogonal to the second RE set, and the second multiple access signature being used for generating the second radio signal based on a second bit block.

In one subembodiment, the UE 450 corresponds to the UE in the disclosure.

In one subembodiment, the gNB 410 corresponds to the base station in the disclosure.

In one subembodiment, at least the former two of the receiver 456, the receiving processor 452 and the controller/processor 490 are used for receiving first control information.

In one subembodiment, at least the former two of the transmitter 456, the transmitting processor 455 and the controller/processor 490 are used for transmitting a first radio signal.

In one subembodiment, at least the former one of the transmitting processor 455 and the controller/processor 490 generates a first radio signal.

In one subembodiment, at least the former two of the transmitter 456, the transmitting processor 455 and the controller/processor 490 transmit a second radio signal.

In one subembodiment, at least the former one of the transmitting processor 455 and the controller/processor 490 generates a second radio signal.

In one subembodiment, at least the former two of the receiver 456, the receiving processor 452 and the controller/processor 490 are used for receiving second control information.

In one subembodiment, at least the former two of the transmitter 416, the transmitting processor 415 and the controller/processor 440 are used for transmitting first control information.

In one subembodiment, at least the former two of the receiver 416, the receiving processor 412 and the controller/processor 440 are used for receiving a first radio signal.

In one subembodiment, at least the former two of the receiver 416, the receiving processor 412 and the controller/processor 440 are used for receiving a second radio signal.

In one subembodiment, at least the former two of the transmitter 415, the transmitting processor 415 and the controller/processor 440 are used for transmitting second control information.

Embodiment 5

Figure 5:
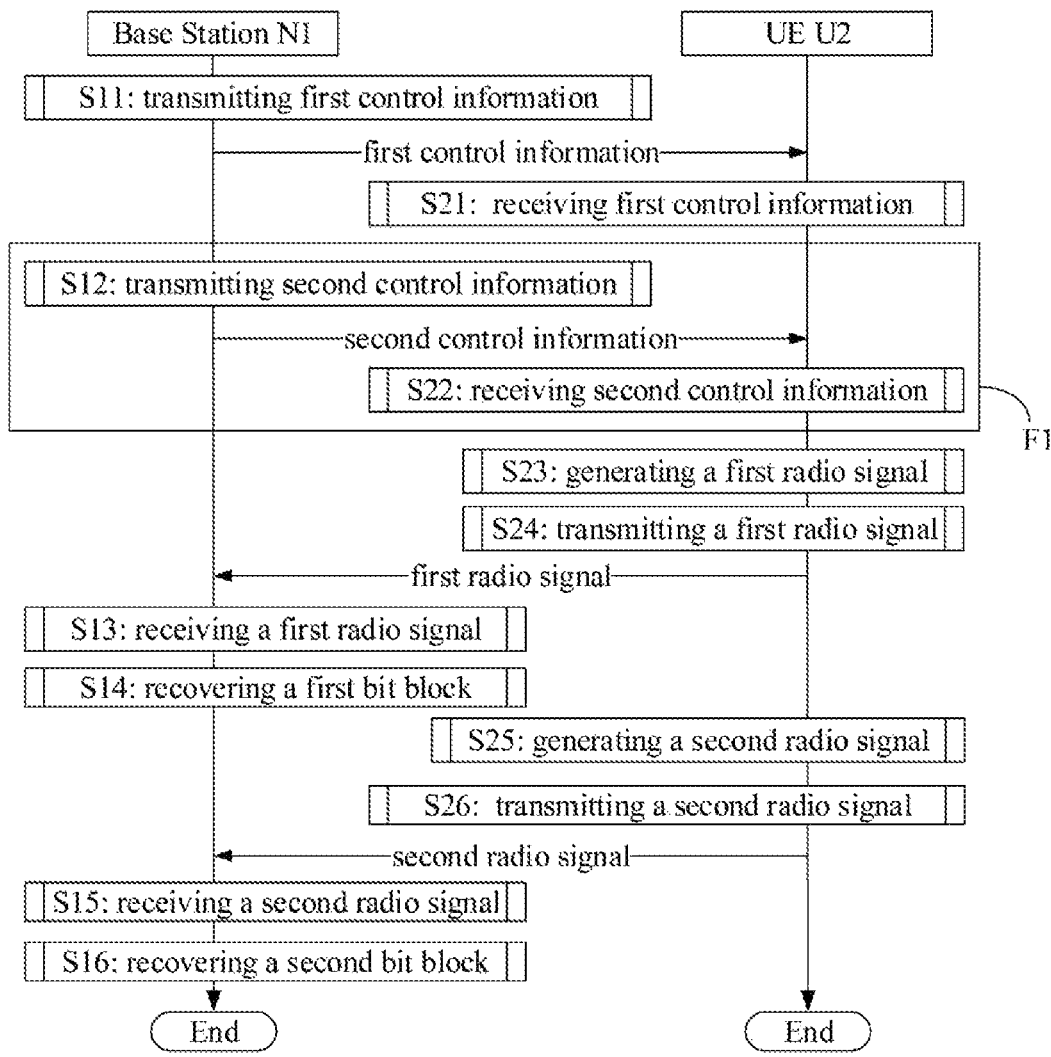
FIG. 5 is a flowchart of wireless transmission according to one embodiment of the disclosure.

Embodiment 5 illustrates an example of a flowchart of a first radio signal, as shown in FIG. 5. In FIG. 5, a base station N1 is a maintenance base station for a serving cell of a UE U2. In FIG. 5, steps in box μl are optional.

The base station N1 transmits first control information in S11, transmits second control information in S12, receives a first radio signal in S13, recovers a first bit block in S14, receives a second radio signal in S15 and recovers a second bit block in S16.

The UE U2 receives first control information in S21, receives second control information in S22, generates a first radio signal in S23, transmits a first radio signal in S24, generates a second radio signal in S25 and transmits a second radio signal in S26.

In Embodiment 5, the first control information is used by the N1 to indicate a first multiple access signature sequence, and the first multiple access signature sequence includes a first multiple access signature and a second multiple access signature in turn; the first radio signal occupies a first RE set, and the first multiple access signature is used by the U2 to generate the first radio signal based on a first bit block; and the second radio signal occupies a second RE set, the first RE set is orthogonal to the second RE set, and the second multiple access signature is used by the U2 to generate the second radio signal based on a second bit block.

In one subembodiment, the first control information indicates a first redundancy version sequence, the first redundancy version sequence is associated with the first multiple access signature sequence, the first multiple access signature corresponds to a first redundancy version in the first redundancy version sequence, the second multiple access signature corresponds to a second redundancy version in the first redundancy version sequence, the first redundancy version is used by the U2 to generate the first bit block, and the second redundancy version is used by the U2 to generate the second bit block.

In one subembodiment, if the first redundancy version is the same as the second redundancy version, the first multiple access signature is the same as the second multiple access signature.

In one subembodiment, the first bit block and the second bit block carry a same transport block.

In one subembodiment, the second control information is used by the N1 to indicate a difference value between the second multiple access signature index and the first multiple access signature index.

In one subembodiment, the multiple access signature includes at least one of a spreading sequence, a mapping constellation, an interleaving table and a scrambling sequence.

Embodiment 6

Figure 6:
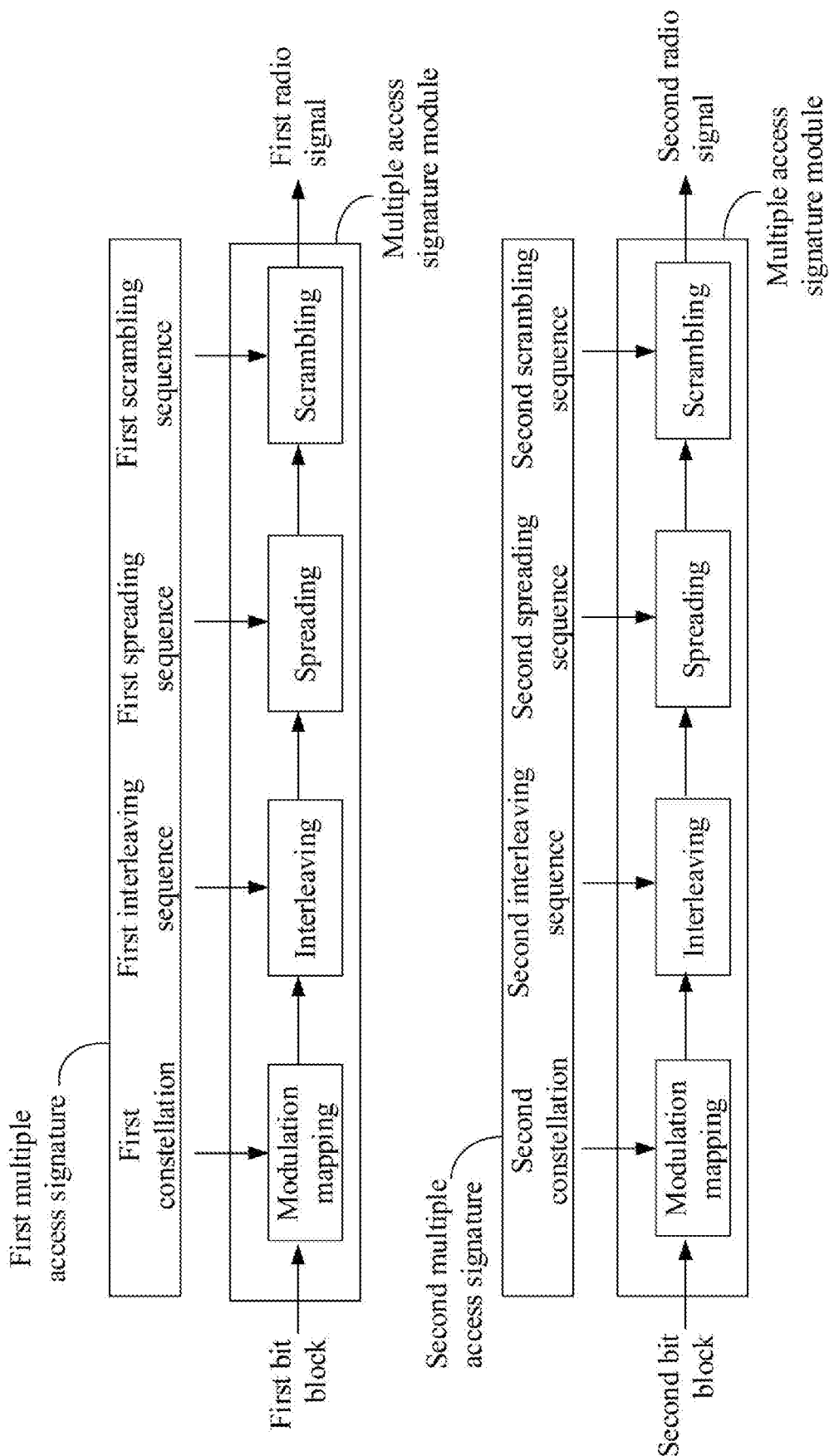
FIG. 6 is a diagram illustrating a first multiple access signature and a second multiple access signature according to one embodiment of the disclosure.

Embodiment 6 illustrates an example of a first multiple access signature and a second multiple access signature, as shown in FIG. 6.

In Embodiment 6, a multiple access signature module includes one or more of sub-modules used for performing modulation mapping, interleaving, spreading and scrambling on one bit block, the first multiple access signature and the second multiple access signature in the disclosure are applied to the multiple access signature module, the first multiple access signature includes one or more of a first constellation used for modulation mapping, a first interleaving sequence used for interleaving, a first spreading sequence used for spreading and a first scrambling sequence used for scrambling, which correspond(s) to the sub-module (s) in the multiple access signature module. The second multiple access signature includes one or more of a second constellation used for modulation mapping, a second interleaving sequence used for interleaving, a second spreading sequence used for spreading and a second scrambling sequence used for scrambling, which correspond(s) to the sub-module(s) in the multiple access signature module.

In one subembodiment, the modulation mapping sub-module maps bits to a complex plane.

In one subembodiment, the modulation mapping refers to a modulation mapping step in Sparse Code Multiple Access (SCMA).

In one subembodiment, the interleaving sub-module rearranges elements constituting an input sequence.

In one subembodiment, the interleaving refers to symbol level interleaving after modulation mapping in Interleave Division Multiple Access (IDMA).

In one subembodiment, the spreading sub-module spreads an input sequence, and an output sequence from the spreading sub-module has a length greater than that of the input sequence.

In one subembodiment, the first spreading sequence is a sparse sequence.

In one subembodiment, the first spreading sequence consists of 1 and −1.

In one subembodiment, the first spreading sequence consists of 1, −1 and 0.

In one subembodiment, the number of 0's is greater than the number of non-zero elements in the first spreading sequence.

In one subembodiment, the scrambling sub-module scrambles an input sequence, changes the value of each element constituting the input sequence, and does not change the length of the input sequence.

In one subembodiment, the first scrambling sequence is one pseudorandom sequence.

In one subembodiment, the first scrambling sequence is one m sequence.

In one subembodiment, the second spreading sequence is a sparse sequence.

In one subembodiment, the second spreading sequence consists of 1 and −1.

In one subembodiment, the second spreading sequence consists of 1, −1 and 0.

In one subembodiment, the number of 0's is greater than the number of non-zero elements in the second spreading sequence.

In one subembodiment, the scrambling sub-module scrambles an input sequence, changes the value of each element constituting the input sequence, and does not change the length of the input sequence.

In one subembodiment, the second scrambling sequence is one pseudorandom sequence.

In one subembodiment, the second scrambling sequence is one m sequence.

Embodiment 7

Figure 7:
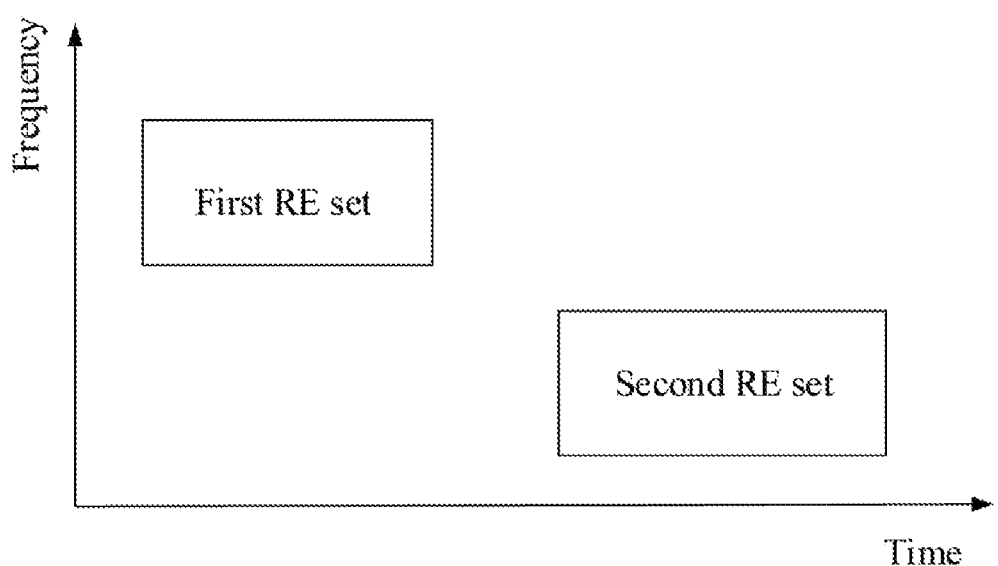
FIG. 7 is a diagram illustrating a first RE set and a second RE set according to one embodiment of the disclosure.

Embodiment 7 illustrates an example of a first RE set and a second RE set, as shown in FIG. 7.

In Embodiment 7, the first RE set in the disclosure is orthogonal to the second RE set in the disclosure in time-frequency domain, and no RE belongs to both the first RE set and the second RE set. The RE is a smallest granularity of time-frequency resources in a wireless system in the disclosure. The second RE set is located behind the first RE set in time domain.

In one subembodiment, one RE occupies a frequency-domain width of one subcarrier in frequency domain.

In one subembodiment, one RE occupies a time-domain width occupied by one multicarrier symbol in time domain.

In one subembodiment, the multicarrier symbol is an OFDM symbol.

In one subembodiment, the multicarrier symbol is a DFT-s-OFDM symbol.

In one subembodiment, the first RE set and the second RE set occupy a same resource in frequency domain.

In one subembodiment, the first RE set and the second RE set occupy different resources in frequency domain.

Embodiment 8

Embodiment 8 illustrates an example of a relationship between a first redundancy version sequence and a first multiple access signature sequence, as shown in FIG. 8.

In Embodiment 8, the first redundancy version sequence includes a redundancy version #1, a redundancy version #2, a redundancy version #3 and a redundancy version #4 in turn. The first multiple access signature sequence includes a multiple access signature #1, a multiple access signature #2, a multiple access signature #3 and a multiple access signature #4 in turn. The redundancy versions in the first redundancy version sequence are one-to-one corresponding to the multiple access signatures in the first multiple access signature sequence. A UE performs multiple access signature on a bit block generated by a redundancy version, using a multiple access signature corresponding to the redundancy version.

In one subembodiment, in retransmissions, the UE employs in turn the redundancy versions in the first redundancy version sequence to generate bit blocks.

In one subembodiment, the first bit block and the second bit block are transmitted in twice of retransmissions respectively.

In one subembodiment, the first bit block and the second bit block carry a same transport block Embodiment 9

Figure 9:
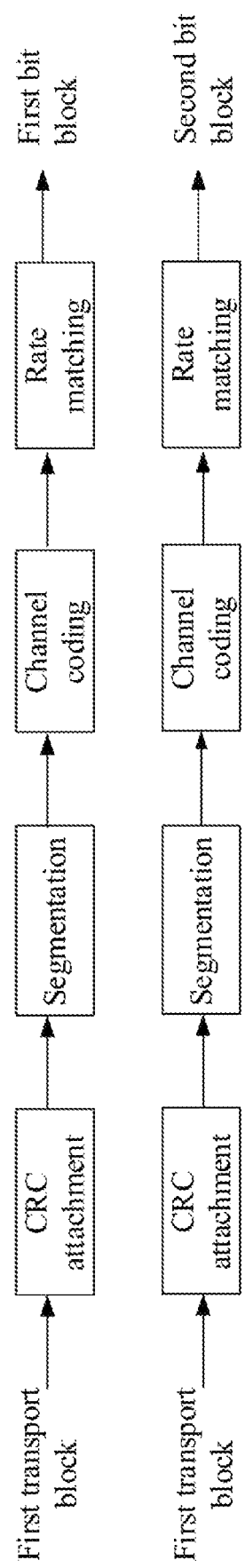
FIG. 9 is a diagram illustrating a case in which a first bit block and a second bit block carry a same transport block according to one embodiment of the disclosure.

Embodiment 9 illustrate an example of a case in which a first bit block and a second bit block carry a same transport block, as shown in FIG. 9.

In Embodiment 9, a first transport block is used for generating a first bit block and a second bit block in the disclosure. The first transport block is processed through twice of Cyclic Redundancy Check (CRC) attachments, segmentations, channel coding and rate matching to generate the first bit block and the second bit block respectively. The first transport block includes a positive integer number of bits.

In one subembodiment, the first transport block carries data.

In one subembodiment, the first transport block carries a higher-layer signaling.

In one subembodiment, the first transport block carries an RRC signaling.

In one subembodiment, a PUSCH is used for transmitting the first transport block.

In one subembodiment, a CRC is applied to a redundancy check additional module, and is attached behind the bits in the first transport block.

In one subembodiment, a Low-density parity-check code (LDPC) is used for channel coding.

In one subembodiment, the first multiple access signature and the second multiple access signature in the disclosure are used for generating the first radio signal and the second radio signal in the disclosure based on the first bit block and the second bit block.

In one subembodiment, different redundancy versions are used for generating the first bit block and the second bit block, and the first multiple access signature is different from the second multiple access signature.

In one subembodiment, a same redundancy version is used for generating the first bit block and the second bit block, and the first multiple access signature is the same as the second multiple access signature.

Embodiment 10

Figure 10:
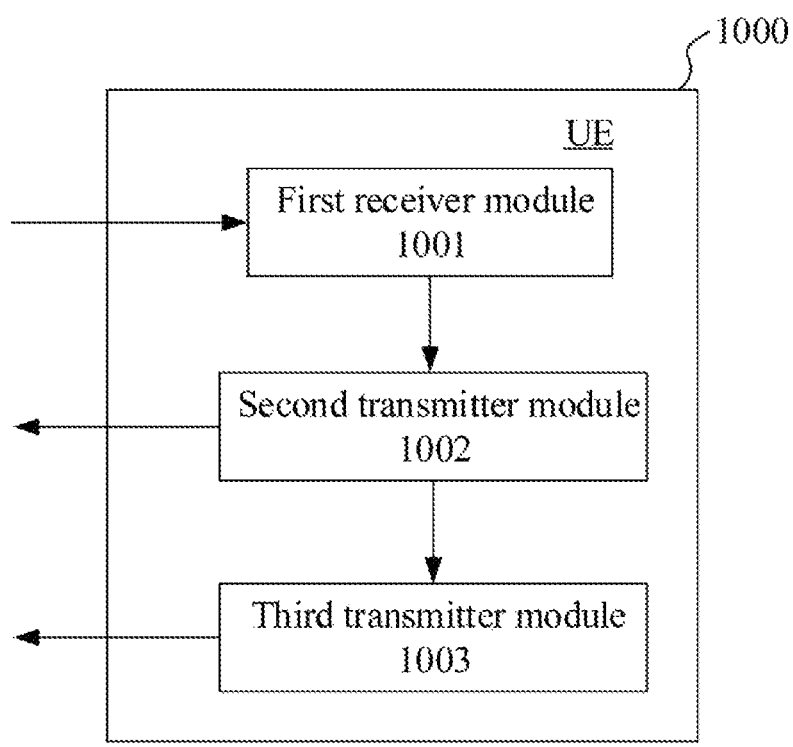
FIG. 10 is a structure block diagram illustrating a processing device in a UE according to one embodiment of the disclosure.

Embodiment 10 illustrates an example of a structure block diagram of a processing device in a UE, as shown in FIG. 10. In FIG. 10, the processing device 100 in the UE is mainly composed of a first receiver module 10001, a second transmitter module 1002 and a third transmitter module 1003.

The first receiver module 1001 receives first control information.

The second transmitter module 1002 transmits a first radio signal.

The third transmitter module 1003 transmits a second radio signal.

In Embodiment 10, the first control information is used for indicating a first multiple access signature sequence, and the first multiple access signature sequence includes a first multiple access signature and a second multiple access signature in turn; the first radio signal occupies a first RE set, and the first multiple access signature is used for generating the first radio signal based on a first bit block; and the second radio signal occupies a second RE set, the first RE set is orthogonal to the second RE set, and the second multiple access signature is used for generating the second radio signal based on a second bit block.

In one subembodiment, the second transmitter module 1002 generates the first radio signal, and the third transmitter module 1003 generates the second radio signal.

In one subembodiment, the first control information indicates a first redundancy version sequence, the first redundancy version sequence is associated with the first multiple access signature sequence, the first multiple access signature corresponds to a first redundancy version in the first redundancy version sequence, the second multiple access signature corresponds to a second redundancy version in the first redundancy version sequence, the first redundancy version is used for generating the first bit block, and the second redundancy version is used for generating the second bit block.

In one subembodiment, if the first redundancy version is the same as the second redundancy version, the first multiple access signature is the same as the second multiple access signature.

In one subembodiment, the first bit block and the second bit block carry a same transport block.

In one subembodiment, the first receiver module 1001 receives second control information, the second control information is used for indicating a difference value between the second multiple access signature index and the first multiple access signature index.

In one subembodiment, the multiple access signature includes at least one of a spreading sequence, a mapping constellation, an interleaving table and a scrambling sequence.

In one subembodiment, the first receiver module 1001 includes at least the former two of the receiver 456, the receiving processor 452 and the controller/processor 490 mentioned in Embodiment 4.

In one subembodiment, the second transmitter module 1002 includes at least the former two of the transmitter 456, the transmitting processor 455 and the controller/processor 490 mentioned in Embodiment 4.

In one subembodiment, the third transmitter module 1003 includes at least the former two of the transmitter 456, the transmitting processor 455 and the controller/processor 490 mentioned in Embodiment 4.

Embodiment 11

Figure 11:
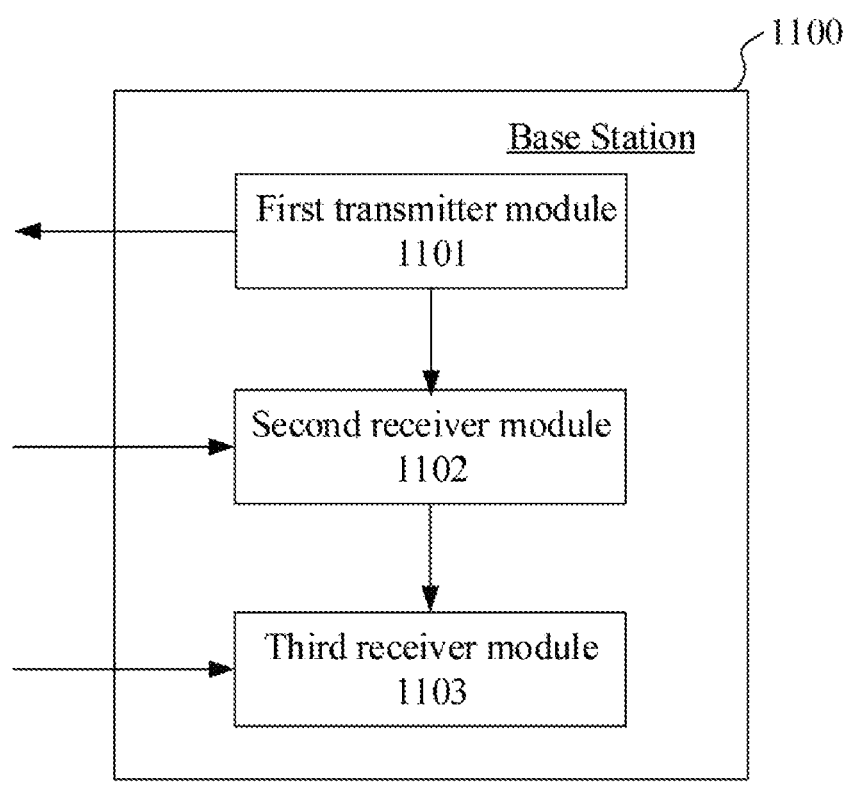
FIG. 11 is a structure block diagram illustrating a processing device in a base station according to one embodiment of the disclosure.

Embodiment 11 illustrates an example of a structure block diagram of a processing device in a base station, in FIG. 11. In FIG. 11, the processing device 1100 in the base station is mainly composed of a first transmitter module 1101, a second receiver module 1102 and a third receiver module 1103.

The first transmitter module 1101 transmits first control information.

The second receiver module 1102 receives a first radio signal.

The third receiver module 1103 receives a second radio signal.

In Embodiment 11, the first control information is used for indicating a first multiple access signature sequence, and the first multiple access signature sequence includes a first multiple access signature and a second multiple access signature in turn; the first radio signal occupies a first RE set, and the first multiple access signature is used for generating the first radio signal based on a first bit block; and the second radio signal occupies a second RE set, the first RE set is orthogonal to the second RE set, and the second multiple access signature is used for generating the second radio signal based on a second bit block.

In one subembodiment, the second receiver module 1102 recovers the first bit block; and the third receiver module 1103 recovers the second bit block.

In one subembodiment, the first control information indicates a first redundancy version sequence, the first redundancy version sequence is associated with the first multiple access signature sequence, the first multiple access signature corresponds to a first redundancy version in the first redundancy version sequence, the second multiple access signature corresponds to a second redundancy version in the first redundancy version sequence, the first redundancy version is used for generating the first bit block, and the second redundancy version is used for generating the second bit block.

In one subembodiment, if the first redundancy version is the same as the second redundancy version, the first multiple access signature is the same as the second multiple access signature.

In one subembodiment, the first bit block and the second bit block carry a same transport block.

In one subembodiment, the first transmitter module 1101 transmits second control information, the second control information is used for indicating a difference value between the second multiple access signature index and the first multiple access signature index.

In one subembodiment, the multiple access signature includes at least one of a spreading sequence, a mapping constellation, an interleaving table and a scrambling sequence.

In one subembodiment, the first transmitter module 1101 includes at least the former two of the transmitter 416, the transmitting processor 415 and the controller/processor 440 mentioned in Embodiment 4.

In one subembodiment, the second receiver module 1102 includes at least the former two of the receiver 416, the receiving processor 412 and the controller/processor 440 mentioned in Embodiment 4.

In one subembodiment, the third receiver module 1102 includes at least the former two of the receiver 416, the receiving processor 412 and the controller/processor 440 mentioned in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, gNB, TRP, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising in turn:
   receiving first control information, the first control information being used for indicating a first multiple access signature sequence, the first multiple access signature sequence comprising a first multiple access signature and a second multiple access signature in turn;
   receiving second control information, the second control information being used for indicating a difference value between the second multiple access signature index and the first multiple access signature index;
   transmitting a first radio signal, the first radio signal occupying a first Resource Element (RE) set, and the first multiple access signature being used for generating the first radio signal based on a first bit block; and
   transmitting a second radio signal, the second radio signal occupying a second RE set, the first RE set being orthogonal to the second RE set, and the second multiple access signature being used for generating the second radio signal based on a second bit block.

2. The method according to claim 1, comprising:
   generating the first radio signal; and
   generating the second radio signal.

3. The method according to claim 1, wherein the first control information indicates a first redundancy version sequence, the first redundancy version sequence is associated with the first multiple access signature sequence, the first multiple access signature corresponds to a first redundancy version in the first redundancy version sequence, the second multiple access signature corresponds to a second redundancy version in the first redundancy version sequence, the first redundancy version is used for generating the first bit block, and the second redundancy version is used for generating the second bit block.

4. The method according to claim 3, wherein if the first redundancy version is the same as the second redundancy version, the first multiple access signature is the same as the second multiple access signature.

5. The method according to claim 1, wherein the first bit block and the second bit block carry a same transport block; or, the multiple access signature comprises at least one of a spreading sequence, a mapping constellation, an interleaving table and a scrambling sequence.

6. A method in a base station for wireless communication, comprising in turn:
   transmitting first control information, the first control information being used for indicating a first multiple access signature sequence, the first multiple access signature sequence comprising a first multiple access signature and a second multiple access signature in turn;
   transmitting second control information, the second control information being used for indicating a difference value between the second multiple access signature index and the first multiple access signature index;
   receiving a first radio signal, the first radio signal occupying a first RE set, and the first multiple access signature being used for generating the first radio signal based on a first bit block; and receiving a second radio signal, the second radio signal occupying a second RE set, the first RE set being orthogonal to the second RE set, and the second multiple access signature being used for generating the second radio signal based on a second bit block.

7. The method according to claim 6, comprising:
recovering the first bit block; and
recovering the second bit block.

8. The method according to claim 6, wherein the first control information indicates a first redundancy version sequence, the first redundancy version sequence is associated with the first multiple access signature sequence, the first multiple access signature corresponds to a first redundancy version in the first redundancy version sequence, the second multiple access signature corresponds to a second redundancy version in the first redundancy version sequence, the first redundancy version is used for generating the first bit block, and the second redundancy version is used for generating the second bit block.

9. The method according to claim 8, wherein if the first redundancy version is the same as the second redundancy version, the first multiple access signature is the same as the second multiple access signature.

10. The method according to claim 6, wherein the first bit block and the second bit block carry a same transport block; or, the multiple access signature comprises at least one of a spreading sequence, a mapping constellation, an interleaving table and a scrambling sequence.

11. A UE for wireless communication, comprising in turn:
a first receiver module, to receive first control information and second control information, the first control information being used for indicating a first multiple access signature sequence, the first multiple access signature sequence comprising a first multiple access signature and a second multiple access signature in turn, the second control information being used for indicating a difference value between the second multiple access signature index and the first multiple access signature index;
a second transmitter module, to transmit a first radio signal, the first radio signal occupying a first RE set, and the first multiple access signature being used for generating the first radio signal based on a first bit block; and
a third transmitter module, to transmit a second radio signal, the second radio signal occupying a second RE set, the first RE set being orthogonal to the second RE set, and the second multiple access signature being used for generating the second radio signal based on a second bit block.

12. The UE according to claim 11, wherein the second transmitter module generates the first radio signal, and the third transmitter module generates the second radio signal.

13. The UE according to claim 11, wherein the first control information indicates a first redundancy version sequence, the first redundancy version sequence is associated with the first multiple access signature sequence, the first multiple access signature corresponds to a first redundancy version in the first redundancy version sequence, the second multiple access signature corresponds to a second redundancy version in the first redundancy version sequence, the first redundancy version is used for generating the first bit block, and the second redundancy version is used for generating the second bit block.

14. The UE according to claim 13, wherein if the first redundancy version is the same as the second redundancy version, the first multiple access signature is the same as the second multiple access signature.

15. The UE according to claim 11, wherein the first bit block and the second bit block carry a same transport block; or, the multiple access signature comprises at least one of a spreading sequence, a mapping constellation, an interleaving table and a scrambling sequence.

16. A base station for wireless communication, comprising in turn:
a first transmitter module, to transmit first control information and second control information, the first control information being used for indicating a first multiple access signature sequence, the first multiple access signature sequence comprising a first multiple access signature and a second multiple access signature in turn, the second control information being used for indicating a difference value between the second multiple access signature index and the first multiple access signature index;
a second receiver module, to receive a first radio signal, the first radio signal occupying a first RE set, and the first multiple access signature being used for generating the first radio signal based on a first bit block; and
a third receiver module, to receive a second radio signal, the second radio signal occupying a second RE set, the first RE set being orthogonal to the second RE set, and the second multiple access signature being used for generating the second radio signal based on a second bit block.

17. The base station according to claim 16, wherein the second receiver module recovers the first bit block; and the third receiver module recovers the second bit block.

18. The base station according to claim 16, wherein the first control information indicates a first redundancy version sequence, the first redundancy version sequence is associated with the first multiple access signature sequence, the first multiple access signature corresponds to a first redundancy version in the first redundancy version sequence, the second multiple access signature corresponds to a second redundancy version in the first redundancy version sequence, the first redundancy version is used for generating the first bit block, and the second redundancy version is used for generating the second bit block.

19. The base station according to claim 18, wherein if the first redundancy version is the same as the second redundancy version, the first multiple access signature is the same as the second multiple access signature.

20. The base station according to claim 16, wherein the first bit block and the second bit block carry a same transport block; or, the multiple access signature comprises at least one of a spreading sequence, a mapping constellation, an interleaving table and a scrambling sequence.

\* \* \* \* \*